April 21, 1964    F. O. STRECK    3,129,947
LIQUID METAL FREEZE-TYPE SEAL
Filed Dec. 23, 1960    2 Sheets-Sheet 1

INVENTOR.
FREDERICK O. STRECK
BY
Gerald A. Koris
ATTORNEY

April 21, 1964 F. O. STRECK 3,129,947
LIQUID METAL FREEZE-TYPE SEAL
Filed Dec. 23, 1960 2 Sheets-Sheet 2

INVENTOR.
FREDERICK O. STRECK
BY
Gerald A. Koris
ATTORNEY

United States Patent Office 3,129,947
Patented Apr. 21, 1964

3,129,947
LIQUID METAL FREEZE-TYPE SEAL
Frederick O. Streck, Costa Mesa, Calif., assignor to North American Aviation, Inc.
Filed Dec. 23, 1960, Ser. No. 78,059
8 Claims. (Cl. 277—22)

This invention relates to a shaft seal. More particularly, this invention is a means of sealing stationary and rotating shaft penetrations in high temperature liquid metal systems.

The freeze-type seal is a relatively economical and simple method of sealing stationary and rotating shaft penetrations in valves and pumps operating in high temperature liquid metal systems. Its principle of operation is to form a barrier between the process system and the atmosphere by freezing the leakage liquid metal in a narrow annulus between the shaft and housing. The frozen slug is held in the annulus by friction and adhesion and when the shaft is rotating, as in a pump, the frozen metal is continuously sheared at the shaft surface and a thin, high viscosity liquid film is maintained at the shear interface. It is believed that friction energy probably supplies the heat necessary to maintain the liquid film, and the high thermal conductivity of the frozen metal permits rapid heat removal so that the film does not become thick enough to allow leakage. A secondary coolant continuously removes heat from the hot liquid metal and the frictional heat generated by the rotating shaft. A description of this type of seal is contained in the "Liquid Metals Handbook—Sodium-NaK Supplement," page 308, July 1, 1955, published by U.S. Department of Commerce, Washington 25, D.C.

Such a seal facilitates the adaptation of commercial equipment to liquid metal process systems, by substituting for conventional fibrous packing, materials which are generally incompatible with liquid metals Fibrous sealing materials rapidly deteriorate due to the chemical action of liquid metals and the high temperature (e.g., 1000° F.) encountered in these systems. Furthermore, the low viscosity of a liquid metal, such as sodium, renders fibrous packing susceptible to leakage. Other elaborately designed seals have been attempted, but such designs are a major factor contributing to the high cost of liquid metal process systems.

Serious deficiencies, however, have been revealed in current freeze-type seals. For instance, the frozen plug in the annulus adjacent the shaft acts as a cold trap, precipitating sodium oxide out of solution. The sodium oxide deposits in the annulus formed between the shaft bushing and shaft, causing severe erosion. Eventually, after sufficient build-up of the oxide, shaft seizure results. Another cause for concern is the potential failure of seal integrity due to a malfunction in the secondary coolant supply. The seal will not fail instantaneously from such an occurrence; however, rapid emergency corrective measures would be essential. A further disadvantage is the instability of the seal temperature during changes in bulk liquid metal temperature and/or pump shaft speed. The seal temperature increases or decreases in direct proportion to variations in these operating conditions, resulting in a non-uniform braking load on the shaft. This is undesirable from the standpoint of component operating efficiency.

Therefore, the primary object of this invention is to provide an improved stationary or rotating shaft freeze seal for high temperature liquid metal systems.

Another object is the provision of an improved two-region freeze seal wherein the leakage liquid metal is divided into a solid and molten phase surrounding the shaft forming in combination, a barrier against further leakage from the system.

Another object of this invention is to eliminate shaft erosion and seizure resulting from the use of freeze seals, by maintaining the leakage liquid metal in the molten state above its oxide precipitation temperature, in a region intermediate to the frozen seal and main process system.

Still another object of this invention is the provision of a frozen liquid metal seal having a constant temperature under all system operating conditions, thereby imposing a minimum steady load on the rotating pump shaft and ensuring seal integrity.

A further object is to produce a reliable freeze seal that is fail-safe in the event of a loss of coolant flow.

The above and other objects and advantages of my invention will become apparent from the following detailed description taken together with the appended claims and the accompanying drawings, made a part hereof, in which:

The above objects are achieved by providing a seal having a solid and a liquid region, comprised of the liquid metal leakage in the frozen and molten states, the liquid region of the seal being adjacent the source of metal leakage. This is accomplished by providing means which channel the initial leakage liquid metal contiguous to the shaft and parallel to its axis, further means which freeze a portion of the leakage around the shaft, and means which maintain the leakage in the molten state between the frozen region and the shaft aperture in the parent component. The molten region is maintained in the liquid state despite changes in shaft speed or bulk liquid metal temperature, by regulating the heat input to this region in response to such variations.

The lower liquid section of the freeze-type seal improves the performance of the seal over a wide range of operating conditions by overcoming many of the disadvantages of the conventional single region freeze seal. For example, in the case of liquid metals which have a tendency to form oxides, the molten liquid metal in the annulus separates the frozen plug and hot liquid metal leaking from the shaft aperture in the process system, thus eliminating the cold trapping action of the frozen plug. Also, shaft seizure and erosion due to collection of precipitated oxides between the shaft and bushing are eliminated by maintaining the entrance to the liquid region of the seal at a constant temperature which exceeds the oxide precipitation point of the liquid metal.

The liquid region of the seal provides other important benefits. It permits maintenance of a constant temperature distribution in the length of solid liquid metal under all operating conditions, thus ensuring seal integrity. Also, the liquid region of the present invention limits the axial length of the frozen seal and provides a minimum, relatively stable braking load on the shaft. This is important at low bulk liquid metal temperatures and shaft operating speeds where the axial length of the seal would otherwise become long enough to impose a braking load that would prevent shaft rotation. Finally, this seal is fail-safe, due to the presence of the liquid region. Should the coolant supply fail, the liquid region acts as a thermal barrier, allowing the frozen region to retain its integrity long enough to either shut down the system or provide an emergency coolant supply, or the lower region could be used for back-up cooling in such an emergency.

Figure 1:
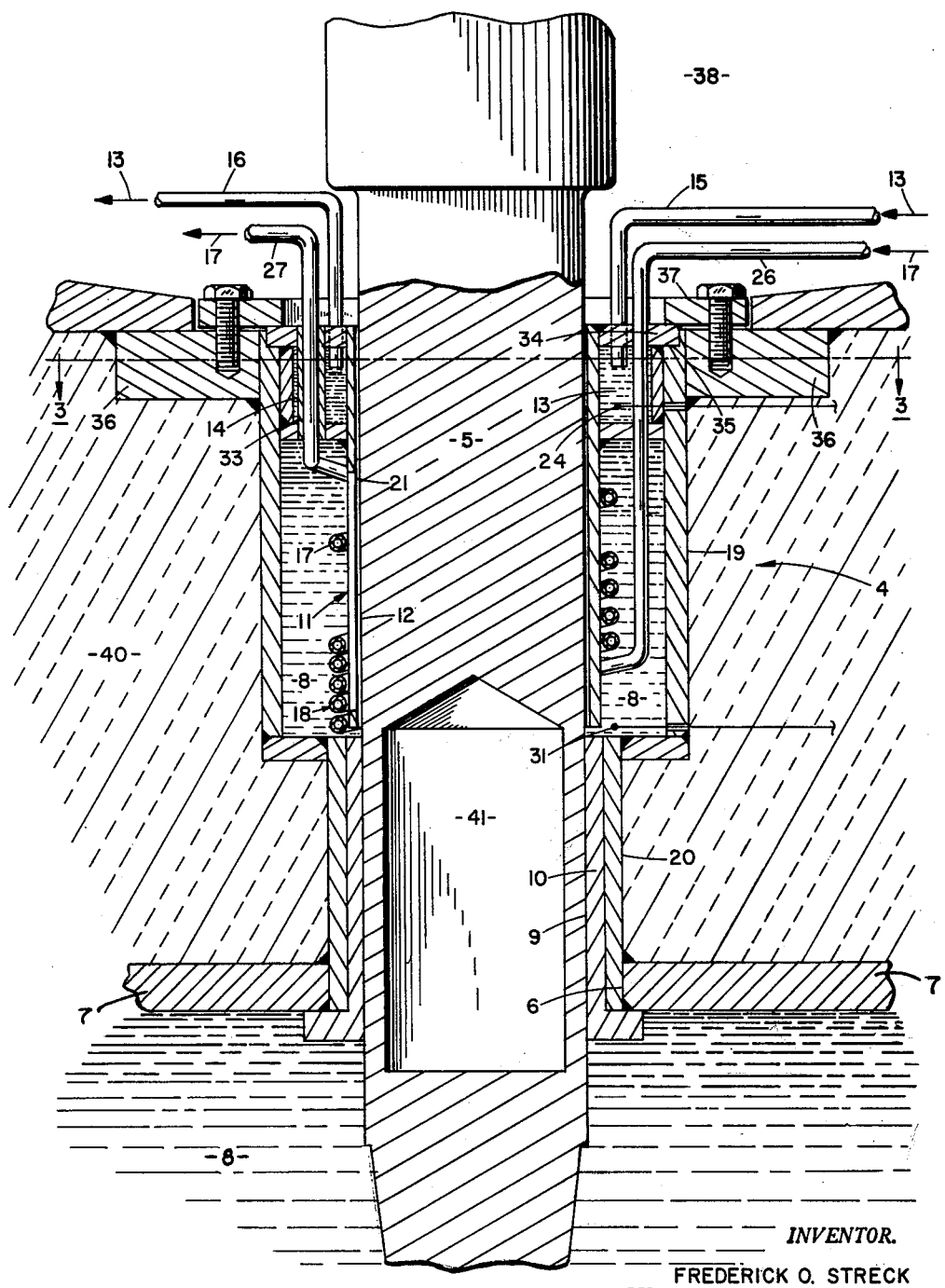
FIG. 1 is a sectional view in elevation of a particular embodiment of my invention.

Referring to the drawings, FIG. 1 shows a particular embodiment of my seal 4 is assembled relationship on a shaft 5 which extends through the aperture 6 in the casing 7 of a component in a liquid metal system 8. The liquid metal 8 normally leaks between shaft 5 and the bearing surface 9 of shaft bushing 10. The seal includes a cylindrical jacket 11 which concentrically circumscribes shaft 5 adjacent the source of leakage along bearing surface 9. The jacket 11 is spaced from shaft 5 to form an annular leakage channel 12 therebetween. A coolant 13, maintained at a temperature lower than the freezing point of the liquid metal 8, flows through a chamber 14 which is integral with shaft jacket 11. The coolant 13 enters chamber 14 through inlet tube 15, passes completely around jacket 11, and exits through outlet tube 16. A fluid 17 having a temperature above the melting point of liquid metal 8, flows through a plurality of tubular heating coils 18 wrapped helically around shaft jacket 11 between the cooling chamber 14 and the end of jacket 11 in proximity to shaft bushing 10. A housing 19 encases the heating and cooling sections of the seal and is connected to the aperture 6 in casing 7 by a bushing guide 20. Upon intial start-up of the process system, the liquid metal 8 contained in casing 7 escapes along the bearing surface 9 and flows into the leakage channel 12 and the interior of the seal housing 19. Longitudinal slots 21 equidistantly disposed around jacket 11 provide an alternate path for passage of liquid metal 8 from the interior of seal housing 19 into the channel 12, thereby ensuring separation of shaft 5 and jacket 11 by a uniform film of liquid metal 8. The coolant 13 freezes the leakage liquid metal 8, forming a solid plug in a section of the channel 12 adjacent the cooling chamber 14. If the liquid metal is pyrophoric, an inert gas 38, such as helium or nitrogen, covers the exposed side of the frozen plug to prevent oxide contamination. The leakage liquid metal contained in the remaining section of channel 12 and in the seal housing 19, is maintained in the molten state by the heating effect of fluid 17.

Figure 2:
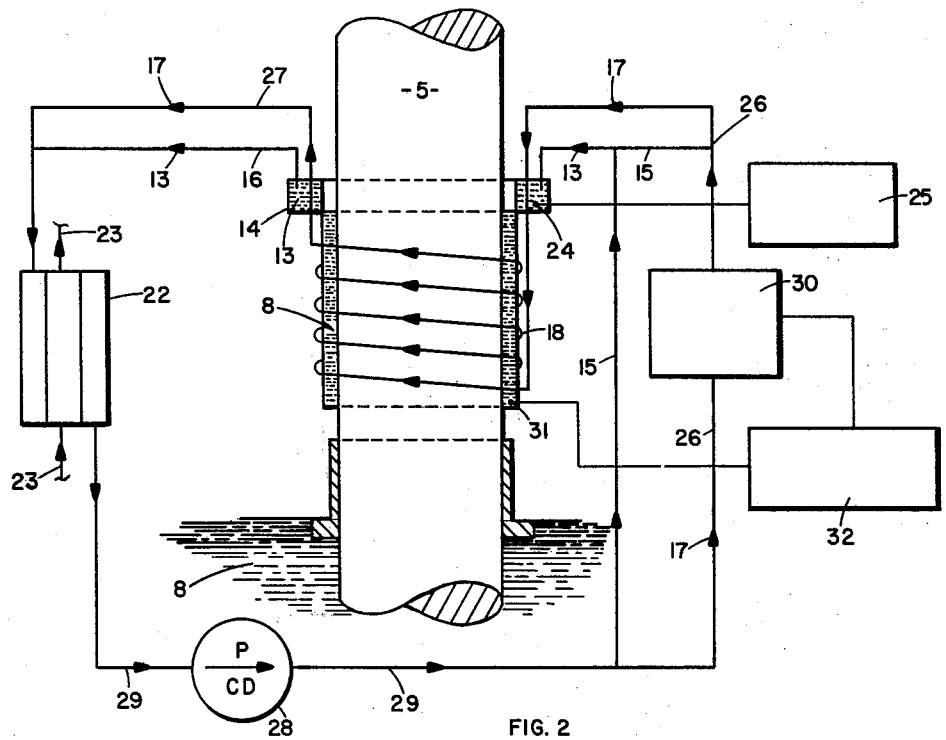
FIG. 2 is a schematic diagram of the seal and its associated components.

In FIG. 2, the coolant 13 is maintained at a constant temperature lower than the freezing point of the liquid metal 8, by conveying coolant 13 through a shell-and-tube type heat exchanger 22. Water is suitable as a secondary coolant 23 to transfer the heat from coolant 13. The coolant temperature is continuously monitored using a thermocouple 24 fixedly inserted in the cooling chamber 14 and connected to a conventional temperature recorder 25.

The heating fluid 17 is delivered through inlet conduit 26 to the bottom of the heating coil 18 adjacent the entrance to the molten region of the leakage channel 12. After passing through coil 18, fluid 17 is conveyed through outlet conduit 27 to heat exchanger 22. In this particular embodiment a common coolant and heating fluid are employed, permitting the use of a single pump 28. The combined fluids from the heating and cooling sections of the seal 4 transfer their heat energy to the secondary coolant 23 in heat exchanger 22, exiting at a temperature lower than the freezing point of the liquid metal 8. Pump 28 returns a predetermined quantity of the coolant 13 through pump conduit 29 and inlet tube 15 to the cooling chamber 14. The remaining fixed quantity is delivered through the heater conduit 26 to a heater 30 where the fluid 17 is reheated to a temperature higher than the melting point of liquid metal 8. The heating fluid 17 subsequently flows through inlet conduit 26 to coil 18 where it is recycled.

A thermocouple 31, positioned in proximity to the shaft bushing 10 and the entrance to the molten region of channel 12, detects the temperature of the liquid metal 8 emanating from the leakage source along the bearing surface 9. The heating thermocouple 31 is electrically connected through a conventional controller unit 32 to heater 30. In response to heat load changes in the seal 4, thermocouple 31 signals controller 32 which regulates the energy output of heater 30. Thermocouple 31 has an additional application in connection with liquid metals that form oxides readily. If oxides are permitted to precipitate in the region adjacent shaft bushing 10, the oxides subsequently deposit along bearing surface 9 between bushing 10 and shaft 5. This results in the aforementioned shaft scoring, and possible seizure. Thermocouple 31, in conjunction with controller 32 and heater 30, maintains the liquid metal temperature in this region above the oxide precipitation point (cold trapping temperature of the primary system).

The cooling and heating tubes are fabricated from stainless steel and sized on the basis of anticipated heat loads, fluid flow rates, and pump horsepower requirements. In this particular embodiment the inlet and outlet heating conduits 26 and 27 to heating coil 18 may pass through chamber 14 within a sleeve, such as sleeve 33 positioned around conduit 27, which connects the floor and roof of the chamber.

Cooling chamber 14 may be fabricated from separately formed members, welded together and to the shaft jacket 11, as shown in FIG. 1. The cooling and heating sections of the seal unit 4 are supported by resting a projection 34 of the chamber roof on a shoulder 35, cut from the inner surface of the seal housing 19. The seal housing 19 is supportably welded to the bracket 36 and the bushing guide 20. A hold-down ring 37, bolted to bracket 36, fastens the projection 34 of the chamber roof firmly against the shoulder 35. This configuration facilitates disassembly of the heating and cooling sections of the seal unit from its parent component. After removal of the shaft 5 and hold-down ring 37, the shaft jacket 11 with the heating and cooling sections mounted thereon, can be removed as a unit from the seal housing 19.

Figure 3:
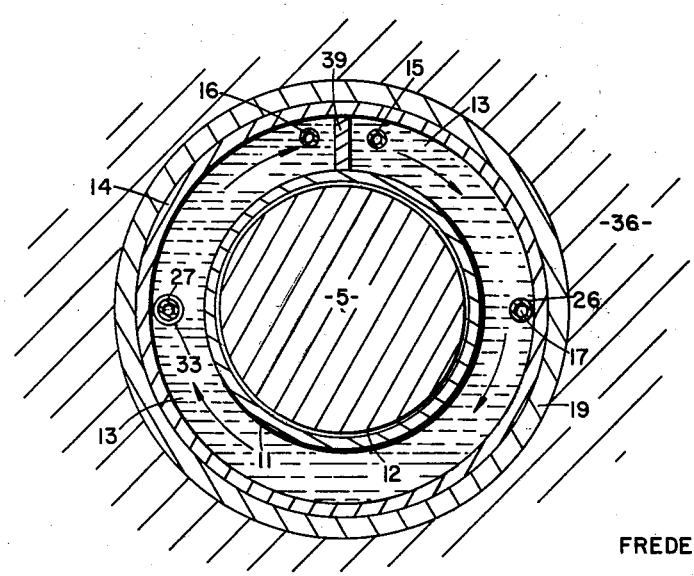
FIG. 3 is a sectional view in plan, taken along the line 3—3 of FIG. 1.

Turning to FIG. 3, the method by which coolant 13 is channeled around the periphery of jacket 11 is apparent. A partitioning member 39 sections the cooling chamber 14 between the inlet and outlet coolant tubes 15 and 16, thereby directing coolant flow around the jacket 11.

A high temperature insulation 40 (FIG. 1) surrounding the seal unit 4 functions as a thermal barrier against heat conduction from the bulk liquid metal 8 to the seal unit. Heat conduction to the seal is decreased further by providing the shaft 5 with an oblong cavity 41 which extends axially from the interior of casing 7 to the seal unit 4. The shaft cavity can be produced by boring a solid shaft and covering its interior end with a plate. Alternatively, heavy tubing might be used for the hollow section, with solid shafting welded to both ends of the tubing.

This improved seal has operated satisfactorily on a pump in a sodium system, with bulk sodium temperatures ranging from 350–945° F., shaft speeds from 0 to 850 r.p.m., sodium pressure 10 p.s.i.a., and inert gas pressure over the seal of 5 p.s.i.g. Sodium-potassium was used as the coolant 13. The temperature of coolant 13 entering chamber 14 was held constant at 95° F., below the freezing point of sodium (208° F.). Close temperature control of the frozen seal was unnecessary as long as the temperature of the coolant 13 was kept well below the freezing point of sodium. The temperature at the entrance to the molten region of the seal was maintained above 250° F., the cold trapping temperature of the system, to minimize deposition of sodium oxide between the shaft 5 and bushing 10, with the resultant scoring of the shaft. It was found that a constant temperature of 270° F. could be maintained at this point by holding the temperature of the heating fluid within the range 240 to 285° F. The seal operated satisfactorily with a fixed heat transfer fluid flow rate to both regions of the seal.

The output of heater 30 (FIG. 2) was regulated by the thermocouple 31 and control unit 32. As the bulk sodium temperature and/or shaft speed increased, the leakage sodium temperature at the entrance to the molten region of the seal 4 increased above 270° F. This increase was detected by the thermocouple 31 which signaled the control unit 32. Control unit 32 decreased the energy output of heater 30 resulting in a decrease in the heating fluid inlet temperature to the coil 18. In this manner, the leakage sodium temperature was maintained at 270° F. under varying operating conditions. During an increase or decrease in either shaft speed or bulk sodium temperature, the solid-liquid interface within the leakage channel 12 either rose or fell. However, for any given set of operating conditions the interface remained at a fixed location. Under all conditions, the frozen sodium seal remained at a constant temperature.

Although the invention has been described with a certain degree of particularity, it is understood that the preferred embodiment has been made by way of example only, and numerous changes in the details of construction and the combination and arrangement of parts may be resorted to without departing from the spirit and the scope of the invention as hereinafter claimed.

What is claimed is:

1. A freeze-type shaft seal for a liquid metal system, comprising channel means for receiving shaft leakage liquid metal from said system contiguous to the shaft and parallel to its axis; means for freezing a first portion of the shaft leakage in said channel around said shaft; and means for maintaining a second portion of said shaft leakage in said channel in the molten state, said second portion being between the frozen region and the shaft source of liquid metal leakage.

2. A freeze-type shaft seal for a liquid metal system, comprising channel means for receiving shaft leakage liquid metal from a source in said system contiguous to the shaft and parallel to its axis; seal enclosing means concentrically circumscribing the shaft and said channel means; means for freezing a first portion of said leakage around said shaft in said channel means; means for maintaining a second portion of said leakage in the molten state in said channel and enclosing means, said second portion being between the frozen portion and the shaft source of liquid metal leakage; and means responsive to variations in heat load for regulating the temperature of the molten region.

3. In a liquid metal component having a casing, a shaft opening defined by said casing and a rotatable shaft projecting through said opening, an improved freeze seal which prevents liquid metal leakage through said shaft opening, comprising an enclosing means concentrically circumscribing said shaft, said enclosing means providing a channel between said shaft and said enclosing means; means for freezing a portion of said leakage around said shaft in said channel; means between the frozen liquid metal and the shaft source of leakage for maintaining the remaining leakage in a molten state; and means for regulating the temperature of said last-named means in response to temperature variations resulting from changes in shaft rotation and liquid metal temperature.

4. A liquid metal freeze seal for a rotatable shaft passing through an aperture in a casing, which prevents liquid metal leakage through said aperture, comprising in combination, a cylindrical jacket coaxially encircling said shaft adjacent said aperture, said jacket spaced from said shaft to form an annulus therebetween which receives leakage liquid metal from said shaft aperture; a constant temperature cooling means adjacent to said jacket for transforming a portion of said leakage in said annulus to the solid state; a heated fluid flowing around said jacket between the frozen liquid metal and said shaft aperture for maintaining the remaining leakage in said annulus in a molten state; and means for regulating the temperature of said heated fluid in response to changes in heat load.

5. A freeze-type shaft seal for liquid metal systems comprising a rotatable shaft passing through an aperture in a casing; a jacket coaxially circumscribing said shaft, said shaft and jacket defining an annulus therebetween; a constant temperature liquid coolant flowing contiguous with said jacket and freezing a portion of said shaft leakage liquid metal in said annulus; a heating means located between said frozen liquid metal and said aperture, said heating means maintaining the remaining liquid metal in said annulus in a molten state; and means for regulating the temperature of said heating means in response to temperature variations resulting from changes in shaft rotation and liquid metal temperature.

6. In liquid metal systems having shaft sources of leakage, an improved freeze seal composed of a cylindrical jacket concentrically circumscribing a shaft adjacent the shaft source of liquid metal leakage, said jacket and shaft spaced to form an annular passage which receives leakage emanating from said shaft source; a constant temperature coolant flowing contiguously to said jacket in an annular chamber, said coolant freezing a portion of said leakage in said annular passage; a heated liquid flowing around said jacket and maintaining the remaining liquid metal in a molten state in said passage between the frozen region and the shaft source of leakage, said heating liquid contained in a plurality of tubular coils helically wound around said jacket periphery; and control means for regulating the temperature of said heating liquid in response to fluctuations in process system heat loads.

7. In a component having a casing, an aperture in said casing and a rotatable shaft projecting through said aperture, an improved freeze seal for preventing sodium leakage between said shaft and said aperture, comprising a cylindrical jacket concentrically surrounding said shaft, said jacket and said shaft spaced to form an annulus therebetween; a constant temperature coolant flowing contiguously to the surface of said jacket through an annular chamber integral with said jacket, said coolant freezing a portion of said leakage sodium in said annulus; a heating fluid flowing through a plurality of tubular coils encircling said jacket, said heating fluid maintaining the remaining leakage sodium in said annulus above its melting point and in abutting relationship with said frozen sodium; and means for regulating the temperature of said remaining sodium to maintain a constant sodium temperature above its oxide precipitation point.

8. The seal of claim 7 wherein said heating liquid and coolant comprise a liquid sodium-potassium alloy.

References Cited in the file of this patent

UNITED STATES PATENTS

| | | |
|---|---|---|
| 1,932,995 | Van Rijswijk | Oct. 31, 1933 |
| 2,213,699 | Gillis et al. | Sept. 3, 1940 |
| 2,799,522 | King et al. | July 16, 1957 |